No. 688,403. Patented Dec. 10, 1901.
G. W. FRAZIER.
ELECTRIC BATTERY.
(Application filed Feb. 14, 1901.)
(No Model.)
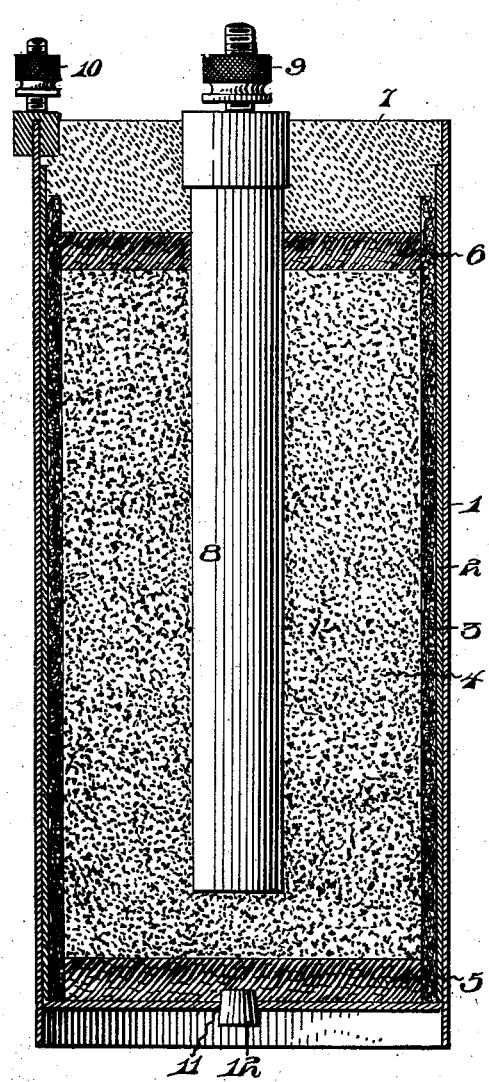
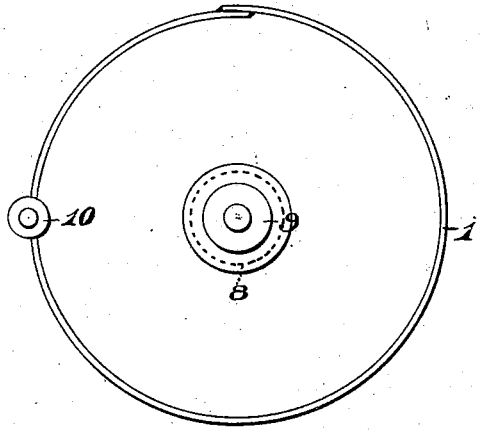
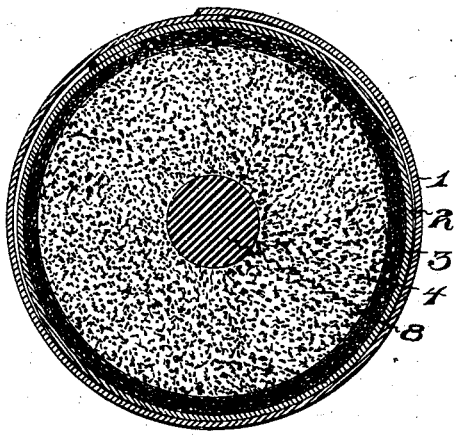
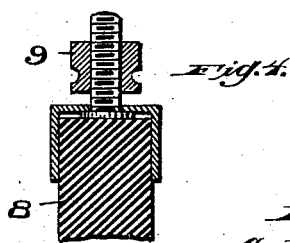

UNITED STATES PATENT OFFICE.

GEORGE W. FRAZIER, OF ALLEGHENY, PENNSYLVANIA, ASSIGNOR OF ONE-HALF TO WILLIAM McB. BELL AND SAMUEL M. EVANS.

ELECTRIC BATTERY.

SPECIFICATION forming part of Letters Patent No. 688,403, dated December 10, 1901.

Application filed February 14, 1901. Serial No. 47,235. (No model.)

*To all whom it may concern:*

Be it known that I, GEORGE W. FRAZIER, a citizen of the United States of America, residing at Allegheny, in the county of Allegheny and State of Pennsylvania, have invented certain new and useful Improvements in Electric Batteries, of which the following is a specification, reference being had therein to the accompanying drawings.

This invention relates to certain new and useful improvements in electric batteries, and relates more particularly to improvements in dry-battery cells; and the object of the invention is to so construct the said cell that after each effective term of service as a battery has expired the said cell in its apparently-exhausted condition may be revivified and again used as a battery-cell and be equally as efficient as when first constructed.

The invention has for its further object to admit moisture or moisture and conducting electrolyte into the bottom of the battery-cell to circulate or be absorbed by capillary attraction throughout the battery-cell.

The invention has for its still further object to construct a cell of the above character that may be extremely simple in its construction, strong, durable, comparatively inexpensive to manufacture, and one that will have a much longer life than the ordinary battery-cells now in use.

The invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1 is a vertical sectional view of my improved battery-cell. Fig. 2 is a top plan view thereof. Fig. 3 is a longitudinal sectional view taken on the line 3 3 of Fig. 1. Fig. 4 is an enlarged vertical sectional view of the binding-post.

In the drawings the reference-numeral 1 indicates the outer casing, made of zinc, having suitably secured thereto an inner casing 2 of the same material.

The reference-numeral 3 indicates a lining of asbestos; 4, an exciting-filling, of any suitable material—for instance, pulverized carbon, preferably electrically manufactured in a furnace, black oxid of vanadium, bichromate of sodium, solution of chlorid of potassium, and chlorid of zinc; 5, a disk of absorbent material arranged at the bottom of the cell, and 6 a similar disk arranged near the top of the cell.

The reference-numeral 7 indicates a sealing-cap composed of asphaltum or like material, and 8 indicates the carbon located within the cell and is its negative electrode, being provided with a binding-post 9, and the positive electrode—namely, the outer casing—is provided with a binding-post 10.

The reference-numeral 11 indicates an opening formed in the bottom of the cell to receive a stopper 12. It will be observed that a number of openings and a number of stoppers may be employed, if desired.

The absorbent material 5 and 6 may be porous clay or any other suitable material. These disks 5 and 6 may be porous or perforated, if desired, in order to allow the free and continuous circulation of water or water and electrolyte upward by capillary attraction through the ceil.

It will be noted that the disks 5 and 6, being of absorbent material and in contact with the lining 3, of asbestos, will permit of the free and continuous circulation of water or water and electrolyte by capillary attraction from the disk 5, where the moisture enters, up through the asbestos lining and across the disk 6, thus providing a complete circuit for the moisture.

To recharge the cell, the stopper or stoppers in the bottom are removed and the battery placed in a shallow vessel containing water or water and electrolyte. The battery-cell absorbs the moisture similar to a plant in a vessel and takes up just sufficient moisture and no more.

The many advantages obtained by the use of my improved battery-cell will be readily apparent from the foregoing description, taken in connection with the accompanying drawings. It will be noted, however, that various changes may be made in the details of construction without departing from the general spirit of my invention as claimed.

Having thus fully described my invention, what I claim as new, and desire to secure by Letters Patent, is—

1. In an electric battery, the combination of a conducting outer casing forming the positive electrode, said casing having an opening or openings arranged in the bottom thereof, an inner casing secured to said outer casing, an interior porous lining, disks of absorbent material arranged within the inner casing, an exciting-filling between said disks, a carbon located in the said filling, a binding-post arranged to said carbon, a binding-post secured to said outer casing, and a stopper or stoppers for said opening or openings in the lower portion of the cell, substantially as described.

2. In a battery-cell, the combination of a conducting outer casing forming the positive electrode, said casing having an opening arranged in the bottom thereof, an inner casing secured to said outer casing, a porous lining arranged in the interior of said inner casing, an exciting-filling in said lining, absorbent disks secured at the lower and upper portion of said exciting-filling, a carbon arranged in said filling, a binding-post secured to said carbon, a binding-post secured to said outer casing, and a sealing material arranged over the upper absorbent disk, all parts being arranged and operating substantially as set forth.

3. In an electric battery, the combination of an outer conducting-casing having an opening or openings, formed therein, an interior porous lining, an exciting-filling within said lining, disks of absorbent material secured at both ends of said filling, a carbon in said filling, and a stopper or stoppers for said opening or openings, substantially as described.

4. In an electric battery, the combination of an outer conducting-casing having an opening or openings formed therein, an inner casing, a porous lining, an exciting-filling within said lining, disks of absorbent material secured at the upper and lower portions of said filling, a carbon provided with a binding-post secured in said filling, a binding-post on the outer casing and a stopper or stoppers for said opening or openings, substantially as described.

In testimony whereof I affix my signature in the presence of two witnesses.

GEORGE W. FRAZIER.

Witnesses:
JOHN NOLAND,
E. E. POTTER.